United States Patent
Thapliya

(10) Patent No.: US 10,226,866 B2
(45) Date of Patent: Mar. 12, 2019

(54) ROBOT CONTROL SYSTEM

(71) Applicant: FUJI XEROX CO., LTD., Tokyo (JP)

(72) Inventor: Roshan Thapliya, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 127 days.

(21) Appl. No.: 15/192,104

(22) Filed: Jun. 24, 2016

(65) Prior Publication Data

US 2017/0239812 A1 Aug. 24, 2017

(30) Foreign Application Priority Data

Feb. 22, 2016 (JP) .................. 2016-030842

(51) Int. Cl.
*B25J 9/16* (2006.01)
*G06F 17/27* (2006.01)
(Continued)

(52) U.S. Cl.
CPC ............ *B25J 9/163* (2013.01); *B25J 9/0003* (2013.01); *B25J 9/1694* (2013.01); *G06F 17/279* (2013.01); *G06F 17/3025* (2013.01); *G06F 17/30256* (2013.01); *G06F 17/30259* (2013.01); *G05B 2219/40411* (2013.01); *G05B 2219/40414* (2013.01); *G10L 25/63* (2013.01)

(58) Field of Classification Search
CPC ........ B25J 9/163; B25J 9/0003; B25J 9/1694; B25J 9/1679; B25J 11/0005–11/001; G06F 17/279; G06F 17/3025; G06F 17/30256; G06F 17/30259; G06F 2203/011; G05B 2219/40411; G05B 2219/40414; G05B 2219/40408; G05B 2219/33056; G05B 2219/36488; G10L 25/63

USPC ............ 700/246, 248, 258, 259; 901/46–47; 706/45, 50, 62
See application file for complete search history.

(56) References Cited

U.S. PATENT DOCUMENTS

| 8,996,429 B1* | 3/2015 | Francis, Jr. ............ G06N 3/008 706/12 |
| 2010/0121808 A1* | 5/2010 | Kuhn ................... G06N 99/005 706/50 |

(Continued)

FOREIGN PATENT DOCUMENTS

JP 2010-110862 A 5/2010

OTHER PUBLICATIONS

Jul. 3, 2017 Extended European Search Report issued in European Patent Application No. 16179351.8.

*Primary Examiner* — Bao Long T Nguyen
(74) *Attorney, Agent, or Firm* — Oliff PLC

(57) ABSTRACT

A robot control system includes: a plurality of conversation-type robots including an acquiring unit configured to acquire conversation information including conversation content during conversation with the user, background information during the conversation with the sure, and information on emotional reaction of a user during the conversation with the user; a collector configured to collect the acquired conversation information; and a generator configured to generate control information for controlling the plurality of conversation-type robots by using the collected conversation information. The plurality of conversation-type robots have a conversation with the user by using the control information to acquire new conversation information from the user.

10 Claims, 10 Drawing Sheets

(51) Int. Cl.
  *G06F 17/30* (2006.01)
  *B25J 9/00* (2006.01)
  *G10L 25/63* (2013.01)

(56) References Cited

U.S. PATENT DOCUMENTS

| | | | |
|---|---|---|---|
| 2010/0298976 A1* | 11/2010 | Sugihara | G06N 3/008 |
| | | | 700/248 |
| 2011/0141258 A1* | 6/2011 | Song | G06K 9/00268 |
| | | | 348/77 |
| 2013/0267319 A1* | 10/2013 | Kuhn | G07F 17/3211 |
| | | | 463/34 |
| 2014/0302931 A1 | 10/2014 | Conceicao | |
| 2015/0286858 A1 | 10/2015 | Shaburov et al. | |
| 2017/0100842 A1* | 4/2017 | Le Borgne | B25J 9/1694 |
| 2017/0113353 A1* | 4/2017 | Monceaux | G10L 13/027 |
| 2017/0120446 A1* | 5/2017 | Veltrop | B25J 9/1661 |
| 2017/0125008 A1* | 5/2017 | Maisonnier | B25J 11/003 |

\* cited by examiner

ROBOT CONTROL SYSTEM

CROSS-REFERENCE TO RELATED APPLICATIONS

This application is based on and claims priority under 35 U.S.C. 119 from Japanese Patent Application No. 2016-030842 filed on Feb. 22, 2016.

BACKGROUND

The present invention relates to a robot control system.

SUMMARY

An aspect of the invention provides a robot control system including:

a plurality of conversation-type robots including an acquiring unit configured to acquire conversation information including conversation content during conversation with the user, background information during the conversation with the sure, and information on emotional reaction of a user during the conversation with the user;

a collector configured to collect the acquired conversation information; and a generator configured to generate control information for controlling the plurality of conversation-type robots by using the collected conversation information, wherein the plurality of conversation-type robots have a conversation with the user by using the control information to acquire new conversation information from the user.

An aspect of the invention provides a method of controlling a robot control system comprising a plurality of conversation-type robots including an acquiring unit configured to acquire conversation information, the method including:

controlling the acquiring unit to acquire the conversation information including conversation content during conversation with the user, background information during the conversation with the sure, and information on emotional reaction of a user during the conversation with the user, collecting the acquired conversation information; and generating control information for controlling the plurality of conversation-type robots by using the collected conversation information, controlling the plurality of conversation-type robots to have a conversation with the user by using the control information to acquire new conversation information from the user.

BRIEF DESCRIPTION OF DRAWINGS

Exemplary embodiments of the present invention will be described in detail based on the following figures, wherein.

DETAILED DESCRIPTION

Figure 1:
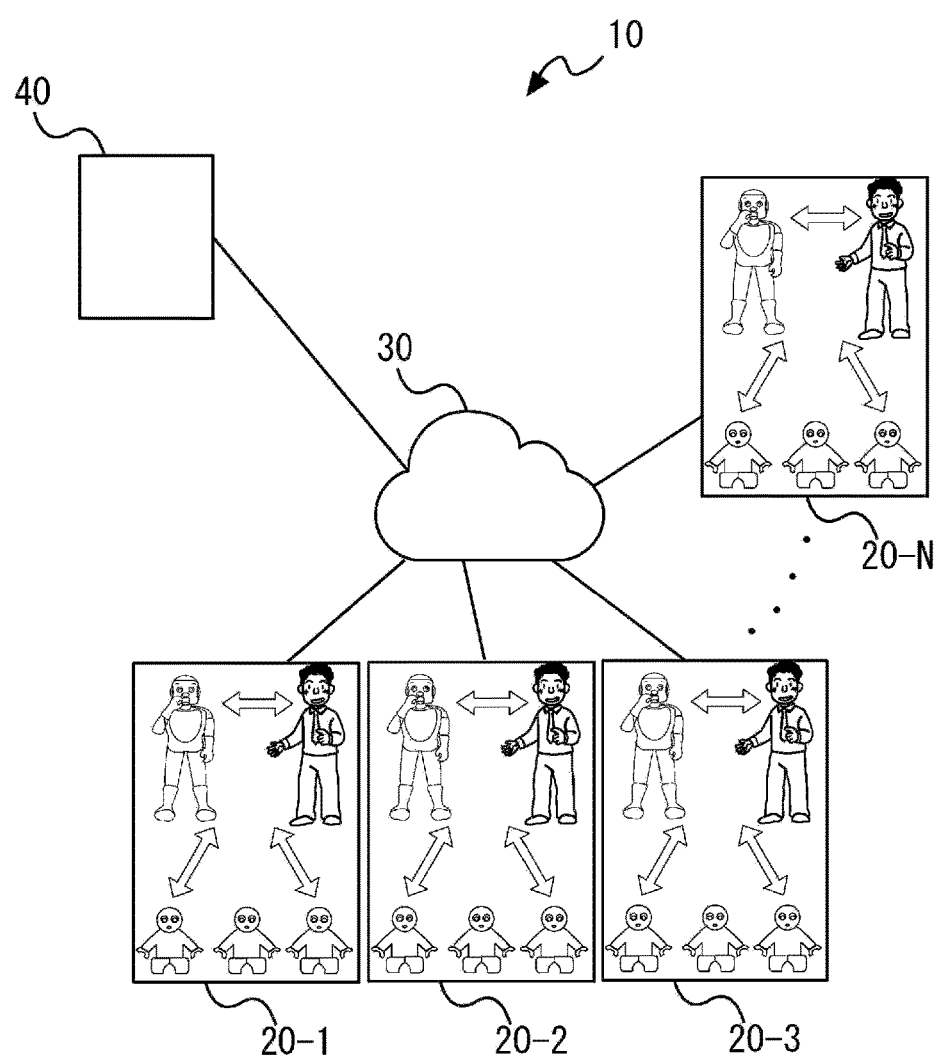
FIG. 1 is an entire schematic diagram illustrating an example of a robot control system 10 according to an exemplary embodiment of the invention.

A robot control system 10 using a conversation-type robot according to an exemplary embodiment of the invention will be described with reference to FIGS. 1 to 3. FIG. 1 is an entire schematic diagram illustrating a robot control system 10 according to this exemplary embodiment. The robot control system 10 is configured to include a plurality of base points 20-1 to 20-N (N in FIG. 1) and an information collecting server 40 which is connected to each of the base points 20-1 to 20-N via a network (the Internet) 30.

Figure 2:
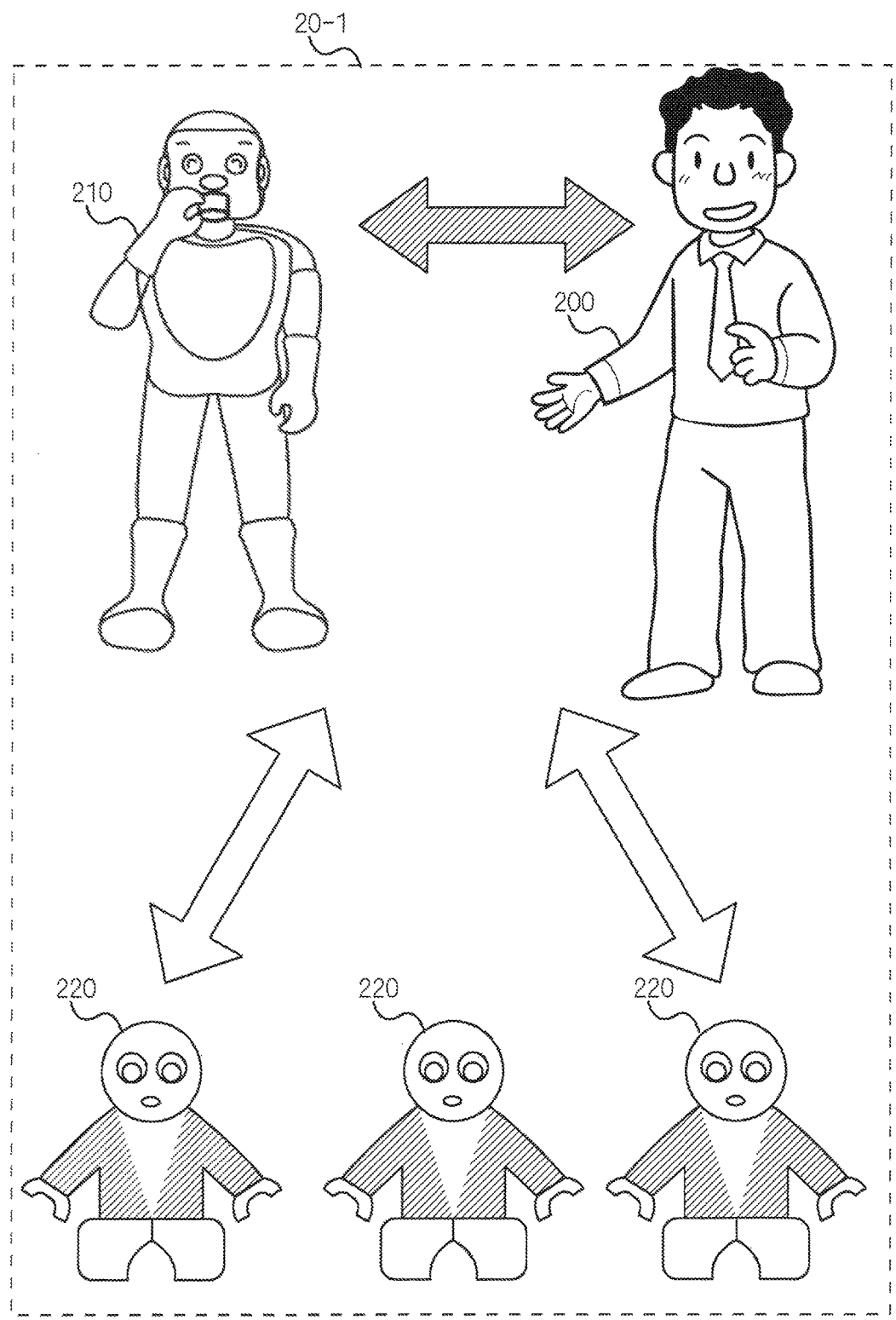
FIG. 2 is a diagram for describing a configuration of each of base points 20-1 to 20-N illustrated in FIG. 1.

FIG. 2 is a diagram for describing a configuration of each of the base points 20-1 to 20-N illustrated in FIG. 1. For simplifying the description, the configuration of the base point 20-1 is exemplified in description. As illustrated in FIG. 2, in the base point 20-1, a user 200 exists, and a conversation-type robot 210 having a conversation with the user 200 and a task execution-type robot (hereinafter, referred to as a slave-type robot) 220 are arranged. Herein, the base point 20-1 is, for example, an office, and the user 200 is an office work who performs various tasks in the office. In addition, in the base point 20-1, although one user 200, one conversation-type robot 210, and three slave-type robots 220 are arranged, the invention is not limited thereto, but a plurality of users 200, one, two, or four or more slave-type robots 220 may be arranged.

The conversation-type robot 210 has a conversation with the user 200. The conversation-type robot 210 is configured in a form of a humanoid robot having a face, hands, and legs as overall appearance. The conversation-type robot 210 acquires comprehensive conversation information (namely, contents, context, and knowhow) including conversation contents, background information, and information on emotional reaction of the user during the conversation with the user 200 to transmit the comprehensive conversation information to the information collecting server 40 via the Internet 30 and to respond to the user with a conversation accompanying with behavior and facial expression by using control information received from the information collecting server 40. The slave-type robot 220 has an outer shape and outer appearance different from those of the conversation-type robot 210, and the slave-type robot may not have a face, hands, or legs. As described later, the slave-type robot 220 performs various indirect tasks based on a command of the conversation-type robot 210.

Figure 3:
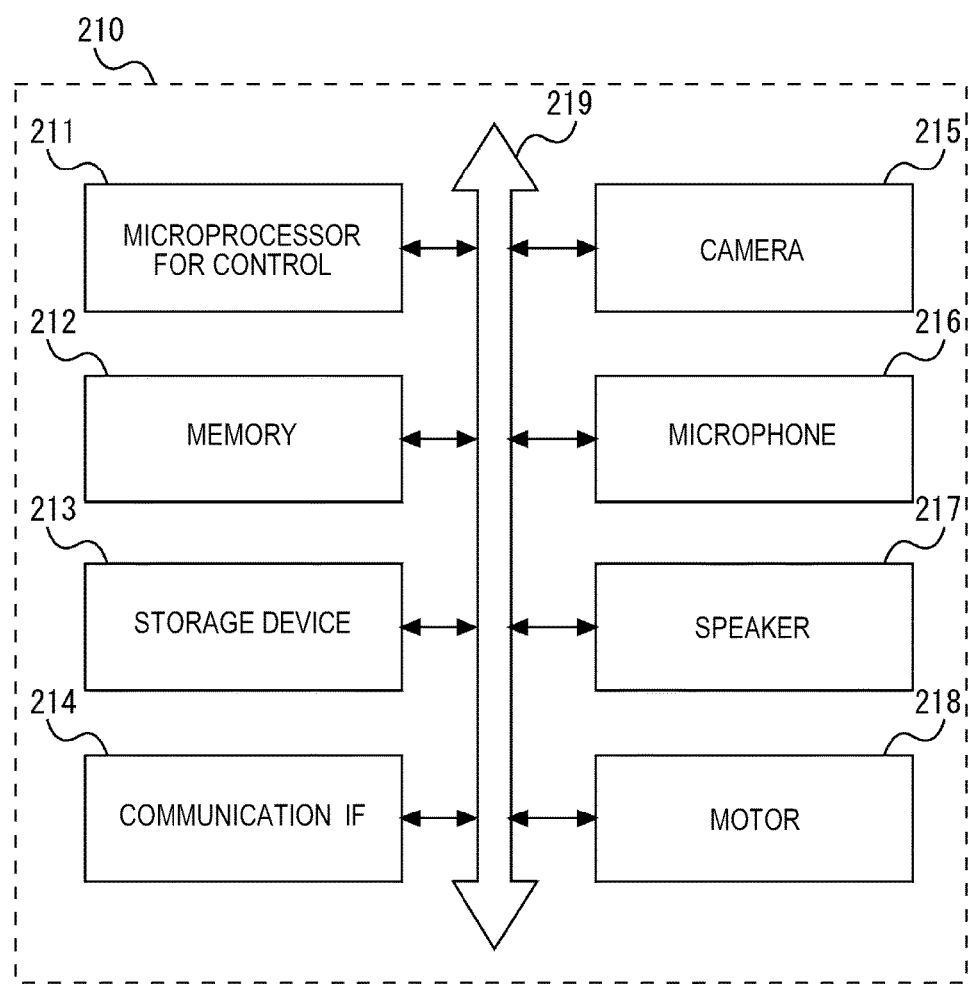
FIG. 3 is a diagram illustrating a hardware configuration of a conversation-type robot 210.

FIG. 3 is a diagram illustrating a hardware configuration of the conversation-type robot 210. As illustrated in FIG. 3, the conversation-type robot 210 is configured to include a microprocessor 211 for control, a memory 212, a storage device 213 such as a hard disk drive (HDD) or a solid state drive (SSD), a communication interface 214, a camera 215, a microphone 216, a speaker 217, and a motor 218 and is connected to each component via a control bus 219.

The microprocessor 211 for control performs overall control over the operations of the components of the conversation-type robot 210 based on a control program stored in the storage device 213. The memory 212 temporarily stores the comprehensive conversation information during the conversation which the conversation-type robot 210 and the user 200 perform with each other, the control information which the conversation-type robot 210 receives from the information collecting server 40 via the Internet 30, and the like.

The communication interface 214 performs communication control for allowing the conversation-type robot 210 to communicate with the information collecting server 40 via the Internet 30 to transmit the comprehensive conversation information acquired in the conversation-type robot 210 to the information collecting server 40 via the Internet 30 or to receive the control information from the information collecting server 40 via the Internet 30.

The camera 215 images sign of changes of the behavior, facial expression, a physical state of the user 200 and stores the sign of changes in the memory 212. During the conversation with the user 200, the microphone 216 detects an audio of the user 200 and stores the audio in the memory 12, namely, records the audio. The speaker 217 outputs the audio generated based on the control information which the conversation-type robot 210 receives from the information collecting server 40. The motor 218 moves each portion such as hands, legs, or face of the conversation-type robot 210 based on the control information to represent specific facial expression or perform behavior.

In addition, the conversation-type robot 210 may include a contact sensor (not shown) or the like. A change in heart rate, body temperature, conductivity, or the like of the user can be detected by the contact sensor. The contact sensor may be a wearable sensor attached to the user's body, and in this case, the contact sensor is separated from the conversation-type robot 210.

Figure 4:
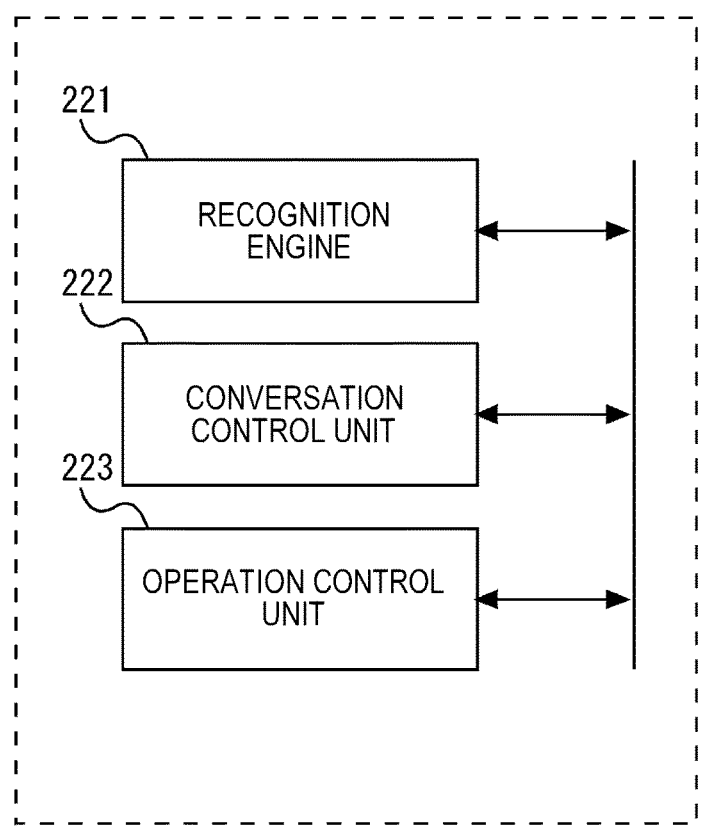
FIG. 4 is a functional block diagram illustrating the conversation-type robot 210.

FIG. 4 is a functional block diagram illustrating the conversation-type robot 210. As illustrated in FIG. 4, the conversation-type robot 210 functions as a recognition engine 221, a conversation control unit 222, and an operation control unit 223 by allowing the microprocessor 211 for control to execute the control program stored in the storage device 213.

The recognition engine 221 interprets emotion of the user 200 based on information on the emotional reaction of the user 200, that is, information configured with any one of behavior, facial expression, complexion, voice tone, speed of voice, and heart rate of the user 200 or a combination thereof. More specifically, the recognition engine analyzes sign representing the emotional reaction such as behavior, facial expression, complexion, and heart rate of the user 200 imaged by the camera 215. For example, a change in complexion can be detected from a change in ratio of RGB of an image of face of the user imaged by the camera 215. The recognition engine 221 calculates a change in heart rate or body temperature of the user based on the change in complexion of the user and interprets the emotion of the user 200 based on the calculation result.

In addition, the recognition engine 221 analyzes an audio signal of the user 200 which is detected by the microphone 216 and is stored in the memory 212 and interprets the emotion of the user 200 based on a tone of voice, a speed of voice (speed of words), or the like. With respect to the interpretation of the emotion, for example, "delighted" is interpreted from a change in complexion and a degree of opening of mouth, "nervous" is interpreted from heart rate and a change in conductivity of skin, and "annoyed" is interpreted from the voice tone and the speed of the words.

The conversation control unit 222 and the operation control unit 223 control a content and/or method of conversation with user based on the control information received from the information collecting server 40. For example, the conversation control unit 222 generates a response message based on the control information received from the information collecting server 40 and outputs the response message to the speaker 217. At this time, the conversation control unit 222 adjusts a magnitude or speaking speed of the output audio of the message based on the control information. In addition, the operation control unit 223 generates a control signal for controlling behavior of hands and legs or facial expression of face of the conversation-type robot 210 based on the control information received from the information collecting server 40 and controls the motor 218.

Herein, the contents included in the conversation information are conversation contents which can be directly grasped from the conversation between the user 200 and the conversation-type robot 210. In addition, the context is intention, background, and context information of the user acquired through the conversation with the user or by using the camera 215, the microphone 216, the contact sensor, or the like. As the intension of the user 200, the context includes for example, user's answers to questions "what do you want to solve?" and "what are you anxious about?". In addition, as the background or context information of the user, the context includes information of nationality, gender, and age of the user, a location of the base point, a position of the user at the current time, a state of the user, and time information.

The knowhow is information on the emotional reaction of the user 200 and is nuance which is not included in the contents or the context, that is, emotion or feelings during the conversation with the user, for example, "delighted", "discomforted", or "embarrassed", as information on emotion of a speaker which is not expressed in the words. In the exemplary embodiment, the knowledge is information interpreted by the recognition engine 221 of the conversation-type robot 210 and is based on at least any one of behavior, facial expression, complexion, voice tone, speed of voice, and heart rate of the user 200 or a combination thereof.

Figure 5:
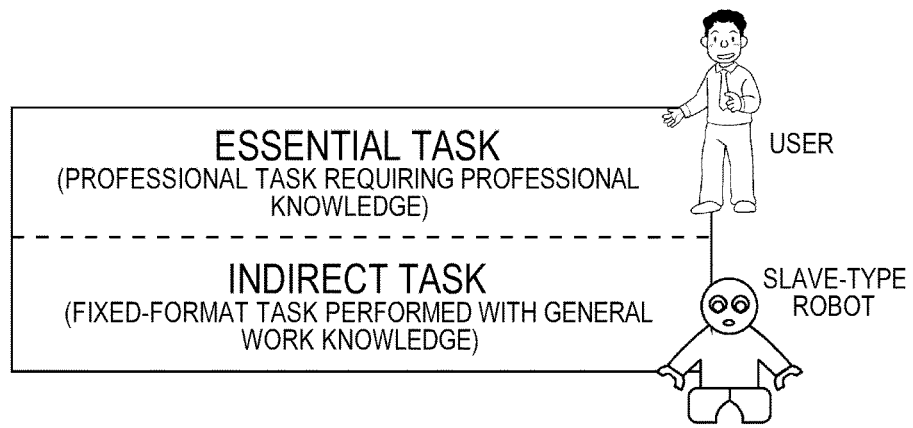
FIG. 5 is a diagram for describing an example of a configuration of all tasks which are to be performed by a user 200 in each of the base points 20-1 to 20-N.

One or more slave-type robots 220 performing indirect tasks are arranged in each of the base points 20-1 to 20-N. Herein, the entire tasks which are to be performed by the user 200 in each of the base points 20-1 to 20-N are classified into essential tasks and indirect tasks. Examples thereof are illustrated in FIG. 5. The essential tasks include professional tasks requiring professional knowledge. While performing conversation with the user 200, the conversation-type robot 210 supports the essential tasks which are performed by the user 200. On the other hand, the indirect tasks do not include the professional tasks and include routine tasks requiring only general work knowledge. The routine tasks include sending a fixed-format document to a large number of counter parties, sending a contact mail to a large number of counter parties, transporting documents to other departments, searching for a method of writing an approval request document, a proposal document, or a contact document, or the like. The slave-type robot 220 executes the routine tasks among the tasks of the user 200 based on a command from the conversation-type robot 210, and the user 200 is freed from the indirect tasks, so that the user can concentrate on the essential tasks.

Figure 6:
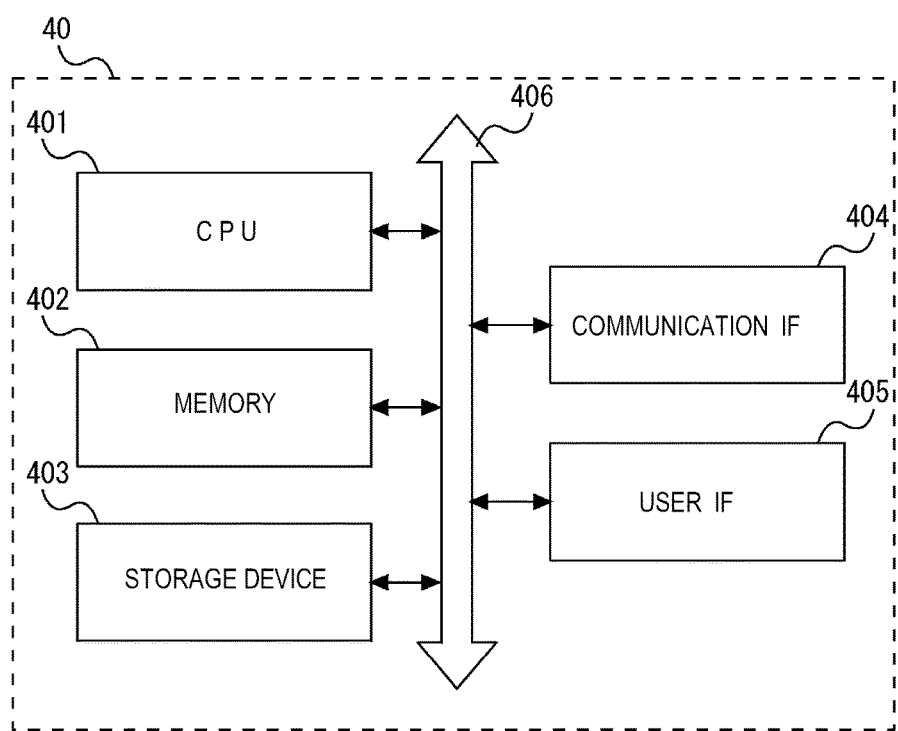
FIG. 6 is a diagram illustrating a hardware configuration of an information collecting server 40.

FIG. 6 is a diagram illustrating a hardware configuration of the information collecting server 40. The information collecting server 40 is configured to include a CPU 401, a memory 402, a storage device 403, a communication interface 404, and a user interface 405, and the components are connected to a control bus 406. A control program is stored in the storage device 403 of the information collecting server 40, and the control program is executed in the CPU 401 to control operations of the components of the information collecting server 40. The communication interface 404 performs controlling of data transmission/reception of receiving the comprehensive conversation information transmitted from the conversation-type robot 210 of each of the base points 20-1 to 20-N or transmitting the control information generated in the information collecting server 40 to each of the base points 20-1 to 20-N via the Internet 30. In addition, the user interface 405 is configured with an input unit such as a keyboard or an output unit such as a display.

Figure 7:
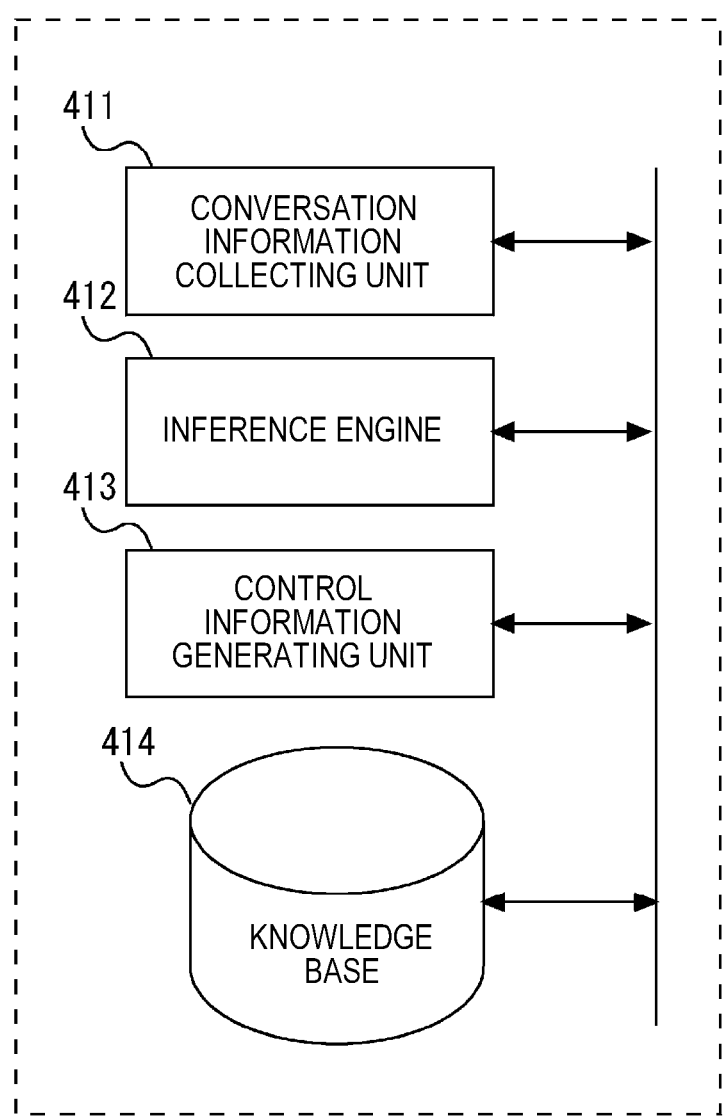
FIG. 7 is a functional block diagram illustrating the information collecting server 40.

FIG. 7 is a functional block diagram illustrating the information collecting server 40. The information collecting server 40 allows the CPU 401 to execute the above-described control program and operates as a server having functions of a conversation information collecting unit 411, an inference engine 412, and a control information generating unit 413, and a knowledge base 414. The conversation information collecting unit 411 collects the comprehensive conversation information of the conversation with the user 200 including the contents, context, and knowledge from each of the base points 20-1 to 20-N. In the collection of the conversation information, the conversation information transmitted from each of the base points 20-1 to 20-N in real time may be collected, or each base point may be requested to transmit the conversation information at every predetermined time, and the conversation information as a response to the request may be collected.

The inference engine 412 evaluates the collected comprehensive conversation information and organizes the conversation information to convert the conversation information into a computer-readable format and to accumulate the conversation information in the knowledge base 414. In the evaluation of the conversation information, it is determined whether or not the conversation information is equal to previously accumulated conversation information; if there is a difference, the conversation information is accumulated as new practical knowledge in the knowledge base 414; if the conversation information is equal to the previously accumulated conversation information, the conversation information is set as practical knowledge having a high frequency of appearance, and the information added with information on the frequency of appearance is updated. The contents, the context, and the knowhow collected from each of the base points 20-1 to 20-N are accumulated as practical knowledge in the knowledge base 414.

The control information generating unit 413 generates control information including conversation contents and a conversation method appropriate for the conversation-type robot 210 responding to the user 200 according to the comprehensive conversation information transmitted from the conversation-type robot 210 of each of the base points 20-1 to 20-N and transmits the control information to the associated base point 20.

An amount of the practical knowledge $K_{eff}$ accumulated in the knowledge base 414 of the information collecting server 40 by the above-described robot control system 10 is expressed by the following Formula (1).

[Mathematical Formula 1]

$$K_{eff}(W, K_A, T, A) = [W(M) \times \{K_A(N, p) \otimes A(P, E)\} \times T(Di)] \quad (1)$$

In the above Formula (1), the practical knowledge $K_{eff}$ is expressed as a function of an amount $W(M)$ of the essential tasks, an amount $K_A(N, p)$ of knowledge collected in the plurality of base points, an emotional impulse response $A(P, E)$ of the user 200, and a reliability $T(Di)$ between the conversation-type robot 210 and the user 200.

As can be understood from the above Formula, the ratio $W(M)$ of the essential tasks which can be performed by the user 200 is increased as the number M of slave-type robots 220 is increased. Namely, if the slave-type robot 220 performs a larger number of the indirect tasks instead of the user 200, the user 200 can concentrate on the essential tasks. As a result, the amount of conversation between the conversation-type robot 210 supporting the essential tasks and the user 200 is increased, and thus, the amount of the comprehensive conversation information which can be acquired from the conversation with the user 200 is increased.

Figure 8A:
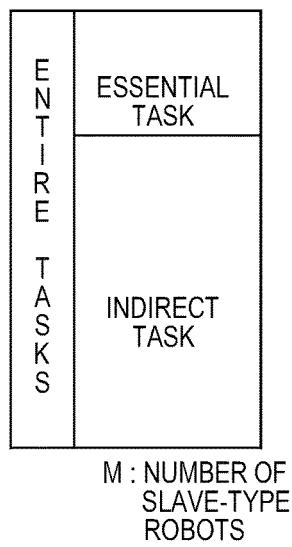
FIG. 8A is a diagram illustrating a ratio of essential tasks and indirect tasks which are performed by the user 200 when the number of slave-type robots 220 is small.
Figure 8B:
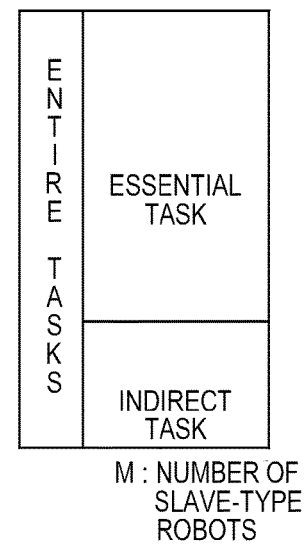
FIG. 8B is a diagram illustrating a ratio of essential tasks and indirect tasks which can be performed by the user 200 when the number of slave-type robots 220 is large.

This situation is illustrated in FIGS. 8A and 8B. FIG. 8A is a diagram illustrating a ratio of essential tasks and indirect tasks which are performed by the user 200 when the number of slave-type robots 220 is small, and FIG. 8B is a diagram illustrating a ratio of essential tasks and indirect tasks which can be performed by the user 200 when the number of slave-type robots 220 is large. As illustrated in FIG. 8A, if the number M of slave-type robots 220 is small, the user 200 is required to perform a large number of indirect tasks, and thus, the ratio of the essential tasks which are to be performed becomes small. However, as illustrated in FIG. 8B, if the number of slave-type robots 220 is large, the slave-type robot 220 performs a larger number of the indirect tasks, and thus, the user 200 is freed from a large number of the indirect tasks. As a result, a ratio $W(M)$ of the essential tasks which are to be performed by the user 200 to the entire tasks is heightened.

In addition, in the above Formula (1), an amount $K_A(N, p)$ of knowledge collected in the plurality of base points 20-1 to 20-N is increased as the number N of base points where the conversation-type robot 210 and the user 200 have a conversation with each other is increased. In addition, the knowledge acquired in each of the base points 20-1 to 20-N has the same value, and as a degree p of difference from others is heightened, the amount $K_A(N, p)$ of knowledge is increased.

Figure 9:
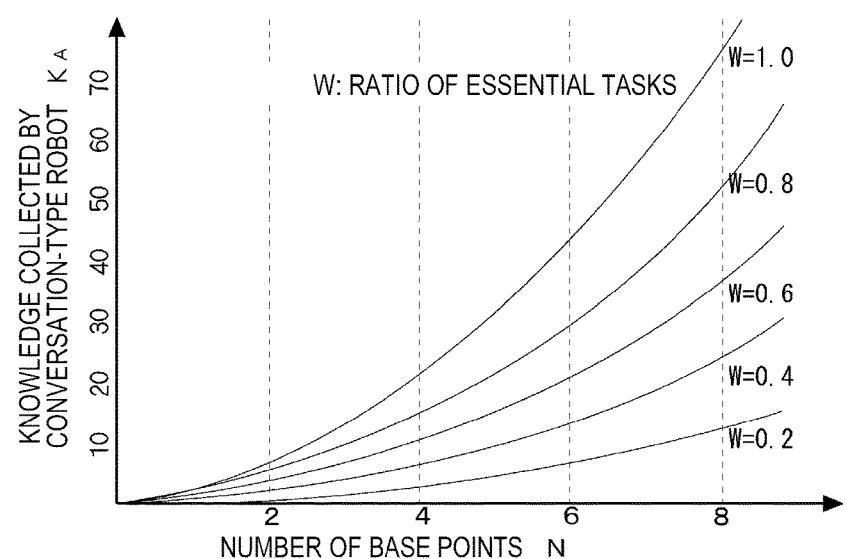
FIG. 9 is a relation between the number of base points 20-1 to 20-N and a ratio of indirect tasks which are performed by the slave-type robot 220 as a substitute for the user 200 and an amount of practical knowledge which can be collected by the conversation-type robot 210.

A graph of FIG. 9 illustrates a relationship among the number of base points 20-1 to 20-N, the ratio of the indirect tasks which are performed by the slave-type robot 220 as a substitute for the user 200, and the amount $K_A$ of knowledge which can be collected by the conversation-type robot 210. As can be understood from FIG. 9, as the number N of base points is increased, the amount $K_A$ of knowledge which can be collected by the conversation-type robot 210 is greatly increased. In addition, if the ratio of the indirect tasks which are performed by the slave-type robot 220 as a substitute for the user is increased (namely, if the ratio W of the essential tasks to the entire tasks which are performed by the user approaches W=1, the amount $K_A$ of knowledge which can be performed by the conversation-type robot 210 is increased. This illustrates that, as the user 200 can further concentrate on the essential tasks, the amount of conversation between the user 200 and the conversation-type robot 210 is increased, the emotional reaction of the user 200 is also increased, and the comprehensive conversation information including nuance of the user which can be collected by the conversation-type robot 210 is increased.

In addition, in the above Formula (1), the emotional impulse response A(P, E) of the user 200 is changed depending on original personality P and emotional state E of the user 200. Namely, as the user 200 has the personality that the user easily expresses emotion, the emotional impulse response A becomes remarkable. In addition, as the emotional state (E) is unstable, the emotional impulse response A becomes remarkable. Namely, as the emotional impulse response A becomes remarkable, the emotional reaction of the user is easy to read, and the amount $K_A$ of practical knowledge which can be collected by the conversation-type robot 210 is increased.

In addition, in the above Formula (1), the reliability T(Di) between the conversation-type robot 210 and the user 200 is increased as the design Di of the conversation-type robot is approximate to a human being. Namely, a robot which is more approximate to a human being, that is, a humanoid robot having hands, legs, and face like a human being is used as the conversation-type robot 210, and the conversation-type robot 210 is allowed to express facial expression on the face, so that the information amount $K_A$ of the practical knowledge acquired from the conversation with the user 200 is increased.

Figure 10:
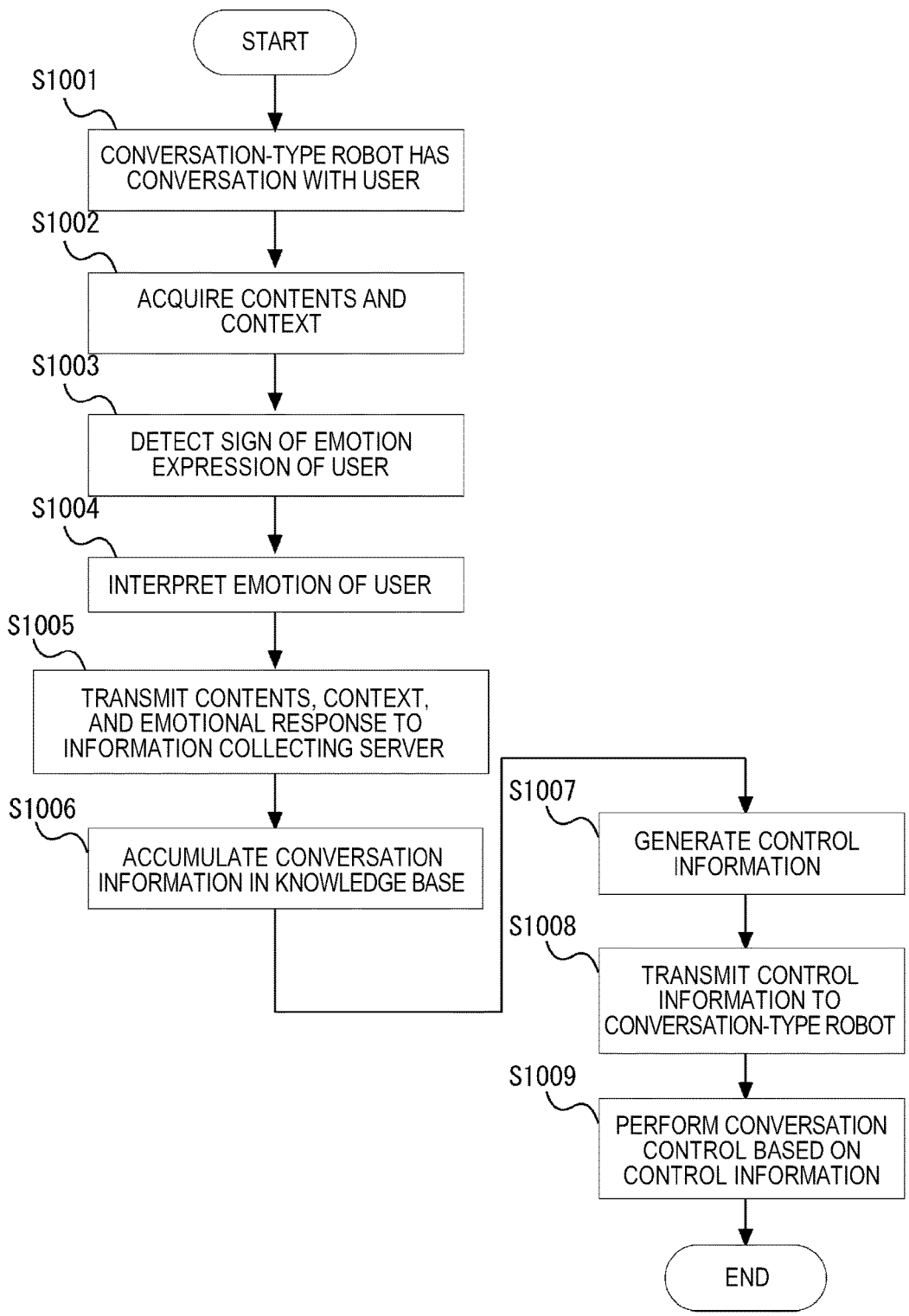
FIG. 10 is a flowchart illustrating a flow of information collecting operations in a robot control system according to an exemplary embodiment.

FIG. 10 is a flowchart illustrating a flow of information collecting operations and robot control operations in a robot control system according to an exemplary embodiment. In step S1001, in a base point (for example, 20-1), the user 200 has a conversation with the conversation-type robot 210. In step S1002, the conversation-type robot acquires contents of conversation obtained from the conversation with the user 200 and background information (context) of the conversation and the user.

In step S1003, the conversation-type robot 210 detects sign such as a change in behavior, facial expression, and a physical state of the user by using sensors such as the camera 215 and the microphone 216. More specifically, the facial expression, complexion, or behavior of the user is detected by the camera, the speed or state (tone) of the words of the user is detected by the microphone, or a change in heart rate, body temperature, conductivity, or the like is detected by a contact sensor.

In step S1004, the recognition engine 221 interprets the emotion of the user 200 based on the sign detected by the camera 215 or the microphone 216. More specifically, "delighted" is interpreted based on the facial expression of the face of the user, for example, a size of the opened mouth, an angle of the corner of the mouth, or a change in complexion, "nervous" is interpreted from a change in heart rate or conductivity of the skin, and "annoyed" is interpreted from the voice tone and the speed of the words.

In step S1005, the conversation-type robot 210 transmits the comprehensive conversation information including the acquired contents, context, and emotional reaction to the information collecting server 40. In step S1006, the conversation information collecting unit 411 of the information collecting server 40 receives the conversation information including the contents, the context, and the emotional reaction transmitted from the conversation-type robot 210 of each of the base points 20 and accumulates the conversation information in the knowledge base 414. At this time, the inference engine 412 of the information collecting server 40 evaluates the received conversation information. Namely, it is determined whether or not the conversation information is equal to previously accumulated conversation information; if there is a difference, the conversation information is accumulated as new practical knowledge in the knowledge base 414; if the conversation information is equal to the previously accumulated conversation information, the conversation information is set as practical knowledge having a high frequency of appearance, and the information added with information on the frequency of appearance is updated.

In the process of step S1007, the control information generating unit 413 generates control information for controlling operations and conversation of the conversation-type robot 210 by using the conversation information previously accumulated in the knowledge base 414 based on the contents and the context included in the conversation information received from a base point (for example, the base point 20-2) other than the above-described base point 20-1, and in step S1008, the control information generating unit transmits the control information to the conversation-type robot 210 of the associated base point 20-2.

In step S1009, the conversation-type robot 210 of the base point 20-2 responds to the user 200 or expresses facial expression or behavior based on the control information received from the information collecting server 40 to have a conversation with the user.

In addition, heretofore, the example where the conversation-type robot 210 of one base point 20-1 among a large number of the base points 20-1 to 20-N collects the comprehensive conversation information from the user 200, accumulates the conversation information in the information collecting server 40, generates the control information by using the conversation information stored in the information collecting server 40, and controls the conversation with the user 200 located in another base point 20-2 based on the control information is described. However, the invention is not limited to the above-described example, but the control information may be transmitted to a base point (for example 20-1) which is the same as the base point collecting the information.

SPECIFIC APPLICATION EXAMPLE 1

Hereinafter, as Specific Application Example 1, a case where the above-described robot control system is applied to a bank will be described. In this example, each brank of a bank corresponds to each of the above-described base points 20-1 to 20-N, and a client of the brank corresponds to the user 200. In a branch (for example, 20-1) of the bank, a conversation-type robot 210 has a conversation with an old client 200. Although the conversation-type robot 210 answers a question of the client 200, the client 200 cannot easily understand the answer and makes a frowny face. The conversation-type robot 210 allows the camera 215 to image the face of the client 200 and allows the recognition engine 221 to interpret the emotion from the facial expression of the client 200. The recognition engine 221 performs the interpretation of "the client is puzzled because the client cannot hear well" or "the client is embarrassed because the client cannot understand the contents of the answer" based on the face expression of "making a frowny face". Next, the comprehensive conversation information including the question of the client 200, the answer of the conversation-type robot 210 to the client 200, the facial expression of the client, and the emotion interpretation information of "the client is puzzled because the client cannot hear well", "the client feels that the contents of the answer are difficult" is transmitted to the information collecting server 40.

The information collecting server 40 accumulates the acquired conversation information in the knowledge base 414. At this time, the inference engine 412 adds information that the client of a specific age cannot hear well in an ordinary voice volume and the contents of the answer are difficult and accumulates the information in the knowledge base 414.

In another branch (for example, 20-2) of the bank, another conversation-type robot 210 which is disposed at the branch and is different from the above conversation-type robot has a conversation with another old client 200. The conversation-type robot 210 answers a question of the client 200. At this time, the conversation-type robot 210 analyzes an image of the client captured by the camera to estimate the age and transmits the age together with the comprehensive conversation information to the information collecting server 40. The control information generating unit 413 of the information collecting server 40 generates control information indicating that it is necessary to make an answer in a loud voice to the client 200 or it is necessary to make an answer with easy expression based on the information stored in the knowledge base 414 and supplies the control information to the conversation-type robot 210 disposed at the branch 20-2.

The conversation-type robot 210 performs making an answer in a louder voice volume or with easier expression than those of the conversation with the client initially performed at the bank based on the control information. Next, the conversation-type robot 210 observes what the client 200 reacts with the answer and outputs the information as the comprehensive conversation information to the information collecting server 40.

SPECIFIC APPLICATION EXAMPLE 2

As Specific Application Example 2, a case where the above-described robot control system 10 is applied to an office will be described. In this example, a plurality of departments of the office correspond to the base points 20-1 to 20-N, and an office worker performing tasks at each department corresponds to the user 200. In a department (for example, 20-1), the conversation-type robot 210 has a conversation with the office worker 200, and the conversation-type robot transmits the comprehensive conversation information acquired from the conversation to the information collecting server 40. The plurality of slave-type robots 220 are disposed in each department 20. The slave-type robots 220 perform the indirect tasks which the office worker 200 needs to perform. The indirect task is, for example, a task that, only if the office worker 200 hands a destination list over to the slave-type robot 220, the slave-type robot sends a fixed-format document to a large number of destinations, distributes or transports luggage or materials to persons of other departments, or sends a contact e-mail to a large number of destinations.

Since the slave-type robots 220 perform the indirect tasks, the office worker 200 is freed from the indirect tasks, and thus, the office worker further concentrates on the essential tasks. Therefore, the amount of the conversation between the office worker 200 and the conversation-type robot 210 is increased, and thus, the conversation-type robot 210 can acquire a larger amount of the comprehensive conversation information from the office worker 200 and transmit the comprehensive conversation information to the information collecting server 40.

In addition, the conversation information collecting unit 411 of the information collecting server 40 generates control information based on the comprehensive conversation information accumulated in the knowledge base 414 and outputs the control information to another conversation-type robot 210 which has a conversation with another office worker 200 in another secondary department 20-2. The conversation control unit 222 and the operation control unit 223 of the conversation-type robot 210 of the department 20-2 controls the contents of the conversation with the office worker 200 or the operations of the conversation-type robot 210 based on the control information received from the information collecting server 40. In this manner, the robot control system 10 can allow the comprehensive conversation information collected in the initial department 20-1 to reflect on the conversation with the office worker 200 of the secondary department 20-2, further acquire the comprehensive conversation information from the office worker 200 of the secondary department 20-2, and accumulate the comprehensive conversation information in the knowledge base 414 of the information collecting server 40.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A robot comprising:
   an acquiring unit configured to acquire conversation information including background information and information on emotional reaction of a user during a conversation with the user; and
   an operation control unit configured to control the conversation with the user based on circumstances where the emotional reaction occurred in response to a reply from the robot to a prior inquiry by the user and affective state information that is generated by way of the acquired conversation information, which includes the information on the emotional reaction of the user, accumulated in a memory.

2. The robot of claim 1, wherein if the acquired conversation information indicates that the user is in difficulty, the operation control unit is further configured to seek for and determine a cause of the difficulty from content of the conversation.

3. The robot of claim 1, wherein the operation control unit is further configured to estimate an age of the user.

4. The robot of claim 1, wherein the controlling of the conversation with the user comprises responding to the user or expressing facial expression or behavior.

5. A robot system, comprising:
   the robot of claim 1, which performs an essential task; and
   a slave robot that performs an indirect task.

6. A robot comprising:
   an acquiring unit configured to acquire conversation information including background information and information on emotional reaction of a user during a conversation with the user; and
   an operation control unit configured to control the conversation with the user based on circumstances where the emotional reaction occurred and affective state information that is generated by way of the acquired conversation information, wherein:
   if the acquired conversation information differs from conversation information previously accumulated in a memory, the acquired conversation information is accumulated in the memory, and if the acquired conversation information is equal to the conversation information previously accumulated in the memory, the previously accumulated conversation information is updated by adding information about frequency of its appearance.

7. The robot of claim 6, wherein if the acquired conversation information indicates that the user is in difficulty, the operation control unit is further configured to seek for and determine a cause of the difficulty from content of the conversation.

8. The robot of claim 6, wherein the operation control unit is further configured to estimate an age of the user.

9. The robot of claim 6, wherein the controlling of the conversation with the user comprises responding to the user or expressing facial expression or behavior.

10. A robot system, comprising:
the robot of claim 6, which performs an essential task; and
a slave robot that performs an indirect task.

* * * * *